United States Patent
Haugen et al.

(10) Patent No.: US 9,742,854 B2
(45) Date of Patent: Aug. 22, 2017

(54) IDENTIFYING INTERACTIONS BY SOCIAL NETWORKING SYSTEM USERS WITH IDENTIFIED ACTIONS PERFORMED OUTSIDE OF THE SOCIAL NETWORKING SYSTEM

(71) Applicant: Facebook, Inc., Menlo Park, CA (US)

(72) Inventors: Austin Daniel Haugen, San Francisco, CA (US); Alex Himel, Palo Alto, CA (US); Zachary Ethan Carpen Rait, Palo Alto, CA (US); Andrew Rothbart, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 765 days.

(21) Appl. No.: 13/759,787

(22) Filed: Feb. 5, 2013

(65) Prior Publication Data

US 2014/0222911 A1    Aug. 7, 2014

(51) Int. Cl.
*H04L 29/08* (2006.01)
*G06Q 30/02* (2012.01)
*G06Q 30/06* (2012.01)
*G06Q 50/00* (2012.01)

(52) U.S. Cl.
CPC ......... *H04L 67/22* (2013.01); *G06Q 30/0255* (2013.01); *G06Q 30/0631* (2013.01); *G06Q 50/01* (2013.01)

(58) Field of Classification Search
CPC ............... G06Q 30/02; G06Q 30/0255; G06Q 30/0269; G06Q 50/01; G06Q 30/0254; G06Q 30/0631; G06Q 30/0639; H04L 51/32; H04L 67/10; H04L 67/306; H04L 12/588; H04L 12/1813; H04L 12/66; H04L 12/1895; H04L 12/5855; H04L 41/0233; H04L 41/0631; H04L 41/0686; H04L 43/10; H04L 43/0817; H04L 51/04; H04L 51/14; H04L 51/24; H04L 51/34; H04L 51/36; H04L 67/22; G06F 3/167; G06F 3/0488; G06F 3/04842; H04M 3/42127; H04M 3/53366
USPC ......... 379/88; 345/173, 473; 705/5, 14, 319; 709/204, 227, 228, 229; 715/731; 707/5
See application file for complete search history.

(56) References Cited

U.S. PATENT DOCUMENTS

| | | | |
|---|---|---|---|
| 2006/0173838 A1* | 8/2006 | Garg et al. | 707/5 |
| 2007/0150603 A1* | 6/2007 | Crull et al. | 709/227 |
| 2008/0215985 A1* | 9/2008 | Batchelder et al. | 715/731 |

(Continued)

*Primary Examiner* — Nicholas Taylor
*Assistant Examiner* — Michael Li
(74) *Attorney, Agent, or Firm* — Fenwick & West LLP

(57) ABSTRACT

Third-party systems outside of a social networking system allow a user of the third-party systems that is also a user of the social networking system to perform an action on the third-party system that are communicated to the social-networking system. Additional actions on the third-party system may be associated with the action. These additional actions are communicated to the social networking system, which identifies the action from the third-party system and associates the additional actions with the identified action. The social networking system may notify the user that performed the action of the additional actions. Also, the social networking system may notify additional social networking system users of the action and of additional actions on the third-party system associated with the action.

32 Claims, 3 Drawing Sheets

(56) References Cited

U.S. PATENT DOCUMENTS

2009/0182589 A1* 7/2009 Kendall et al. .................. 705/5
2011/0265011 A1* 10/2011 Taylor et al. ................ 715/751
2011/0276396 A1* 11/2011 Rathod ..................... 705/14.49

* cited by examiner

IDENTIFYING INTERACTIONS BY SOCIAL NETWORKING SYSTEM USERS WITH IDENTIFIED ACTIONS PERFORMED OUTSIDE OF THE SOCIAL NETWORKING SYSTEM

BACKGROUND

This invention relates generally to social networking systems and in particular to capturing interactions with descriptions of actions performed by users outside of a social networking system.

Social networking systems, or social utilities that track and enable connections between users (including people, businesses, and other entities), have become prevalent in recent years. These social networking systems allow users to more efficiently communicate information. For example, a social networking system user may post contact information, background information, job information, hobbies, and/or other user-specific data to the social networking system. Other users may then review the posted data by browsing user profiles or searching for profiles including specific data. Social networking systems also allow users to associate themselves with other users, creating a web of connections among the users of the social networking system. The social networking system may use these connections to provide users with more relevant information.

Users of a social networking system frequently maintain accounts on systems or applications outside of the social networking system, commonly referred to as "third-party systems" or "third-party applications." These third-party systems or third-party applications may communicate actions to a social networking system for association with a social networking system user performing the actions. Various third-party systems or third-party applications may specify actions and/or objects that are communicated to the social networking system to describe interactions with a third-party system or third-party application. The social networking system may then generate stories or messages to inform other users of the interactions with a third-party system or with a third-party application.

While conventional social networking systems may notify users of an action performed by another user outside of the social networking system, additional actions outside of the social networking system and the user associated with the performed action are not identified by conventional social networking systems as associated with the performed action. For example, a user of a third-party system may comment on another third-party system user's movie rental via the third-party system. While the other user's movie rental and the user's comment are communicated to the social networking system for association with the corresponding users, the relationship between the comment and the movie rental on the third-party system is not communicated to conventional social networking systems. This inability to identify relationships between actions and/or objects maintained outside of the social networking system limits the information about actions outside of the social networking system communicated to social networking system users.

SUMMARY

Users of third-party systems outside of a social networking system may perform actions on the third-party system. For example, users may rent products, purchase products, store information, retrieve information, or perform other actions with the third-party system. Some users of the third-party system may also be users of the social networking system, and the third-party system may communicate actions by these users to the social networking system. For example, a third-party system user may purchase a product via the third-party system, and a description of this purchase is communicated to the social networking system for storage and association with a corresponding user profile maintained by the social networking system. Social networking system users may specify one or more privacy settings to regulate the information about their actions on third-party systems that is maintained by the social networking system.

Other users of the third-party system and of the social networking system may perform additional actions associated with an action performed on the third-party system. For example, additional third-party system users may comment on a user's purchase through the third-party system. A description of these additional actions may be communicated to the social networking system. To allow the social networking system to maintain the relationship between the additional actions and the action, the third-party system includes information identifying the action in the description of the additional actions. For example, an identifier of the action is included in the description of an additional action. When the social networking system stores the description of the additional action, a connection between the additional action and the action is also stored. This allows the social networking system to maintain relationships between various actions performed on the third-party system.

Additionally, the social networking system may notify other users of actions performed on the third-party system by social networking system users. When an additional action associated with an action is performed on the third-party system, the social networking system may modify the description of an action to identify the additional actions. For example, the social networking system may publish a notification that a user purchased a product on a third-party system. If another user of the third-party system that is a social networking system user comments on the purchase via the third-party system, the social networking system updates the published notification to include a description of the comment provided via the third-party system in addition to the purchase.

DETAILED DESCRIPTION

Overview

Figure 1:
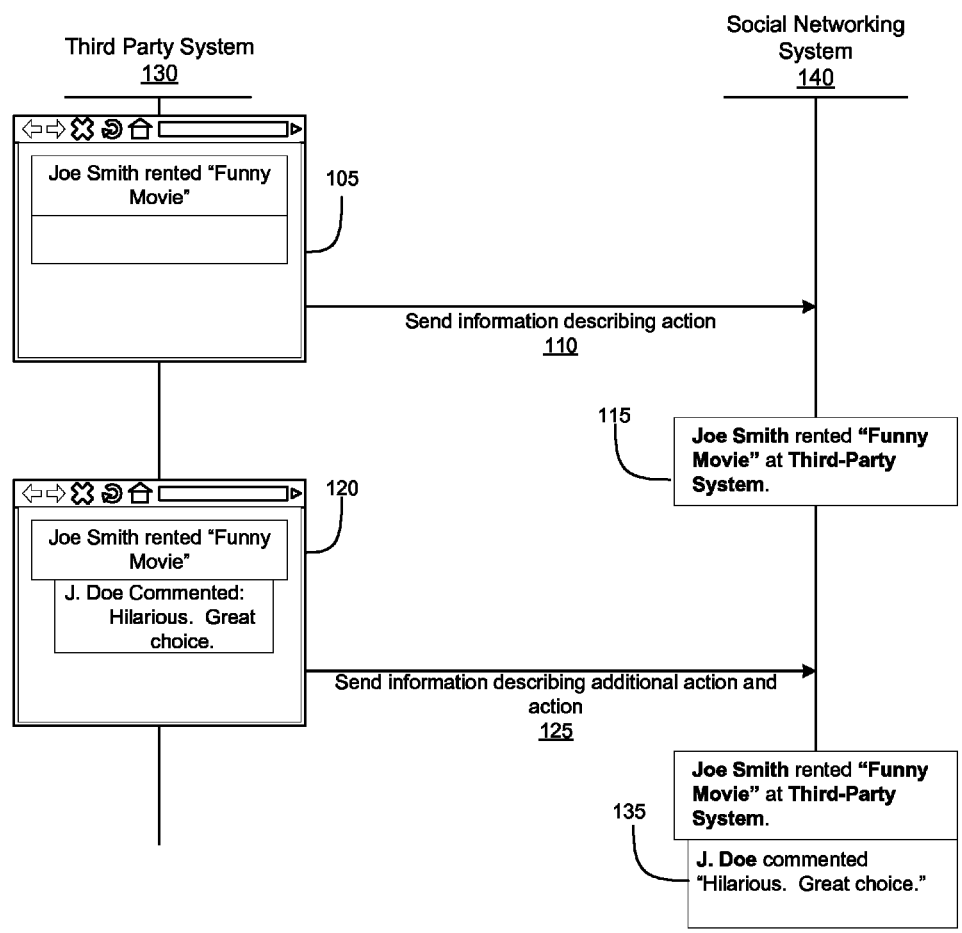
FIG. 1 is an interaction diagram of a method for identifying additional actions associated with an action outside of a social networking system, in accordance with one embodiment.

FIG. 1 illustrates one embodiment of a method for identifying additional actions on a third-party system 130 outside of a social networking system 140 associated with an action on the third-party system 130. In the example shown by FIG. 1, a user of the social networking system 140 rents a movie from a third-party system that is associated with a different domain than the domain of the social networking system 140. While FIG. 1 describes a rental action, any other suitable action on a third-party system 130 may be performed on a third-party system 130 and communicated to the social networking system 140. Additional examples of actions performed on a third-party system 130 include: making a purchase, registering for an account, viewing an item, saving an item to an account, renting an item, making a reservation, subscribing to an information resource, or any other action which the operator of the third-party system 130 identifies for communication to the social networking system 140.

As shown in the example of FIG. 1, the user performs 105 an action with the third-party system 130 through a client application. For example, the user interacts with a web page associated with the third-party system 130 or interacts with a native application associated with the third-party system 130. The third-party system 130 sends 110 information identifying the third-party system 130 and describing the action (e.g., indicating whether the action is a purchase, a rating, a request for information, a subscription, a rental or the like) to the social networking system 140. The information may specify a type of action and may include additional information associated with the action. For example, the information may identify an item purchased or rented or other suitable information.

In one embodiment, the third-party system 130 and/or the social networking system 140 determine whether the user is associated with a user profile maintained by the social networking system 140. For example, the third party system 130 may access a cookie stored on the device used by the user to perform the action and associated with the social networking system 130. As the social networking system 140 and the third-party system 130 are on different domains, the application used to perform the action may include security features that normally prevent a website from one domain from accessing content on other domains, so various methods may be used to allow the social networking system 140 to access the cookie. For example, if the application is a browser, the third-party website 130 may use nested iframes, where the third-party system 130 serves a web page including a nested iframe in the social networking system's domain, allowing the nested iframe to access the user information and send the information back to the third-party system 130. Repeated nesting of iframes further allows the social networking system 140 to communicate information back to the third-party system 130. By using this technique, the third-party system 130 and the social networking system 140 may communicate about the user without sharing any of the user's personal information and without requiring the user to log into the social networking system 140. Alternatively, the information describing the action may include user identifying information (e.g., a login name for the social networking system 140, a login name for the third-party system 130, or any other suitable information). Additional examples of communicating information about actions on a third-party system 130 to the social networking system 140 are described in U.S. application Ser. No. 12/193,705, filed on Aug. 18, 2008, which is hereby incorporated by reference in its entirety.

After the social networking system 140 receives the information describing the action from the third-party website 130, it stores the information and associates the stored information with the user profile of the user that performed the action. In some embodiments, such as the one shown by FIG. 1, the social networking system 140 generates 115 a message describing the action and the user performing the action. The message may be presented to other users of the social networking system 140 connected to the user that performed the action. As shown in FIG. 1, the message may identify the action, the user that performed the action, the third-party system 130 on which the action was performed, and may also include any objects or items associated with the action (e.g., a description of an item purchased or rented, a description of stored information, a description of requested information, or any other suitable information). The message may be included as a story in a newsfeed describing actions taken by social networking system users, may be transmitted as a notification to other social networking system users, or communicated to social networking system users via any suitable communication method. In various embodiments, communication of the message is limited based on one or more privacy settings associated with the user profile of the user that performed the action.

After sending 110 the information describing the action to the social networking system 140, an additional user performs 120 an additional action with the third-party system 130 via a client application. The additional action is associated with the action performed by the user. For example, the additional user may comment on the action performed by the user, express a preference for the action performed by the user (i.e., "like" the action performed by the user), share the action performed by the user with other users, or perform any other suitable action. The third-party system 130 sends 125 information identifying the third-party system 130, describing the additional action (e.g., indicating whether the action is a purchase, a rating, a request for information, a subscription, a rental or the like), and identifying the action associated with the additional action to the social networking system 140. As described above, the identifying information may include any other suitable information.

The social networking system 140 associates the information identifying the additional action with the information identifying the action, allowing the social networking system 140 to maintain the association between the actions even though they occurred outside of the social networking system 140. After storing the information identifying the additional action, the social networking system 140 notifies the user associated with the original action of the additional action. In one embodiment, the social networking system 140 also modifies 135 the message describing the action to describe or identify the additional action associated with the action. In the example of FIG. 1, the message describing a rental via the third-party system 130 is modified 135 to include a comment on the rental provided to the third-party system 130.

System Architecture

Figure 2:
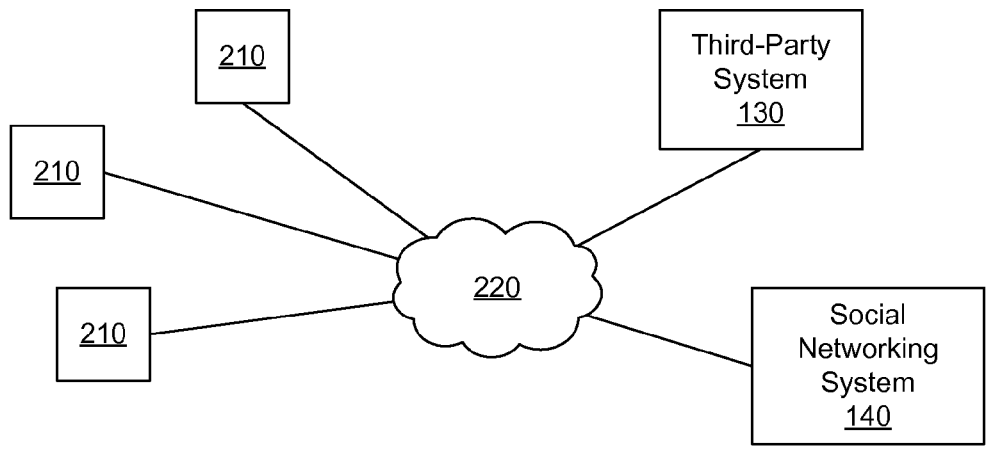
FIG. 2 is a block diagram of a system environment in which an online system operates, in accordance with an embodiment.

FIG. 2 is a high level block diagram illustrating a system environment 200 for an online system. The system environment 200 comprises one or more client devices 210, a network 220, one or more third-party systems 130, and the social networking system 140. In alternative configurations, different and/or additional components may be included in the system environment 200. While described with reference to the social networking system 140, the embodiments described herein may be adapted to online systems that are not social networking systems 140.

A client device 210 is a computing device capable of receiving user input as well as transmitting and/or receiving data via the network 220. In one embodiment, a client device 210 is a conventional computer system, such as a desktop or laptop computer. In another embodiment, a client device 210 may be a device having computer functionality, such as a personal digital assistant (PDA), mobile telephone, smartphone or similar device. A client device 210 is configured to communicate via the network 220. In one embodiment, a client device 210 executes an application allowing a user of the client device 210 to interact with the social networking system 140. For example, a client device 210 executes a browser application to enable interaction between the client device 210 and the social networking system 140 via the network 220. In another embodiment, a client device 210 interacts with the social networking system 140 through an application programming interface (API) that runs on the native operating system of the client device 210, such as IOS® or ANDROID™.

The client devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, code division multiple access (CDMA), digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

One or more third party systems 130 may be coupled to the network 220 for communicating with the social networking system 140, which is further described below in conjunction with FIG. 3. In one embodiment, the third party system 130 is an application provider communicating information describing third-party applications for execution by a client device 210 or communicating data to client devices 210 for presentation. The third party system 130 may also communicate information to the social networking system 140, such as advertisements or information about an application provided by the third party website 130. In various embodiments, a third-party system 130 is associated with a domain that differs from the domain associated with the social networking system 140.

Figure 3:
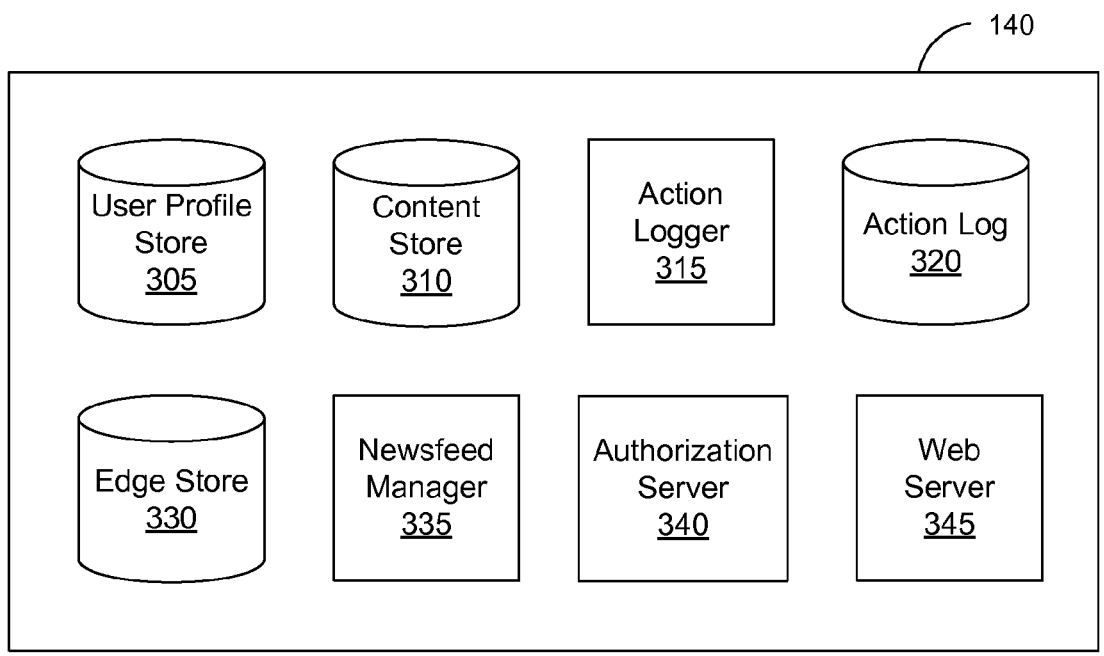
FIG. 3 is a block diagram of a social networking system, in accordance with an embodiment.

FIG. 3 is an example block diagram of an architecture of the social networking system 140. The social networking system 140 includes a user profile store 305, a content store 310, an action logger 315, an action log 320, an edge store 330, a newsfeed manager 335, and a web server 345. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 305. A user profile includes declarative information about the user that was explicitly shared by the user, and may also include profile information inferred by the social networking system 140. In one embodiment, a user profile includes multiple data fields, each data field describing one or more attributes of the corresponding user of the social networking system 140. The user profile information stored in user profile store 305 describes the users of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 305 may also maintain references to actions by the corresponding user performed on content items in the content store 310 and stored in the action log 320.

While user profiles in the user profile store 305 are frequently associated with individuals, allowing people to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 310 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 140, such as status updates, photos tagged by users to be associated with other objects in the social networking system, events, groups or applications. In some embodiments, objects are received from third-party applications, which may be external to the social networking system 140. Content "items" represent single pieces of content that are represented as objects in the social networking system 140. Users of the social networking system 140 are encouraged to communicate with each other by posting text and content items of various types of media through various communication channels, increasing the interaction of users with each other and increasing the frequency with which users interact within the social networking system 140.

The action logger 315 receives communications about user actions on and/or off the social networking system 140, populating the action log 320 with information about user actions. Such actions may include, for example, adding a connection to another user, sending a message to another user, uploading an image, reading a message from another user, viewing content associated with another user, attending an event posted by another user, interacting with a link included in a news story or advertisement, among others. In some embodiments, the action logger 315 identifies interaction between a social networking system user and a brand page within the social networking system 140, which communicates targeting criteria associated with content on the brand page to a content selector to customize content from the brand page. In addition, a number of actions described in connection with other objects are directed at particular users, so these actions are associated with those users as well. These actions are stored in the action log 320. In one embodiment, the action logger 315 notifies a user that performed a logged action of another user performing an action associated with the logged action. For example, the action logger 315 sends a notification message to a user that posted content to the social networking system 140 identifying another user that expressed a preference for the posted content or that shared the posted content. The notification message may be sent using any suitable communication channel.

The action log 320 may be used by the social networking system 140 to track user actions on the social networking system 140, as well as external websites 130 that communicate information to the social networking system 140. Users may interact with various objects on the social networking system 140, including commenting on posts, sharing links, and checking-in to physical locations via a mobile device, accessing content items or other interactions. Information describing these actions is stored in the action log 320. Additional examples of interactions with objects on the social networking system 140 included in the action log 320 include commenting on a photo album, communications between users, becoming a fan of a musician, adding an event to a calendar, joining a groups, becoming a fan of a brand page, creating an event, authorizing an application, using an application and engaging in a transaction. Additionally, the action log 320 records a user's interactions with advertisements on the social networking system 140 as well as other applications operating on the social networking system 140. For example, the action log 320 stores a user's interactions with notifications and with content included in the notifications, such as a link. In some embodiments, data from the action log 320 is used to infer interests or preferences of the user, augmenting the interests included in the user profile and allowing a more complete understanding of user preferences.

The action log 320 may also store user actions taken on systems external to the social networking system 140, such as a third-party system 130. In one embodiment, the action log 320 associates identifiers from a third-party system 130 used by the third-party system 130 to identify an action. For example, the action long 320 maintains an identifier associated with an action by the social networking system 140 as well as a third-party identifier associated with the action by the third-party system 130 on which the action was performed, and from which information describing the action was received. As an example of an action taken on a system external to the social networking system 130, an e-commerce website that primarily sells sporting equipment at bargain prices may recognize a user of a social networking system 140 through social plug-ins that enable the e-commerce website to identify the user of the social networking system 140. Because users of the social networking system 140 are uniquely identifiable, e-commerce websites, such as this sporting equipment retailer, may use the information about these users as they visit their websites. The action log 320 records data about these users, including webpage viewing histories, advertisements that were engaged, purchases made, and other patterns from shopping and buying.

In one embodiment, an edge store 330 stores the information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

The edge store 330 stores information describing characteristics of edges, such as affinity scores for objects, interests, and other users. Affinity scores may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in the edge store 330, in one embodiment. In some embodiments, connections between users may be stored in the user profile store 305, or the user profile store 305 may access the edge store 330 to determine connections between users.

Data stored in the user profile store 305, the content store 310, the action log 320, and the edge store 330 enables the social networking system 140 to generate a social graph that uses nodes to identify various objects and edges connecting nodes to identify relationships between different objects resulting from an action that was performed by one of the nodes on the other node. Building upon this understanding of a social graph, which comprises nodes and edges, the social graph can be "opened" by enabling third-party developers and third-party systems 130 to define objects and actions that imitate real-world interactions to be published to the social graph. For example, as users of the social networking system 140 use third party systems 130, their actions external to the social networking system 140 may be captured and reported to the social networking system 140. Hence, a third party system 130 reports a user's interaction according to structured actions and objects in the social graph. The action logger 315 interprets the received interaction according to the definitions of the action and object maintained by the social networking system 140, allowing the interaction to be included in the social graph.

A newsfeed manager 335 selects candidate stories from content store 310 and analyzes the candidate stories to select stores included in a newsfeed. Information from additional components of social networking system 140, such as the user profile store 305, the action log 320, and the edge store 330, is also retrieved and used by newsfeed manger 335 to generate a newsfeed personalized for a user of social networking system 140. For example, the newsfeed manager 335 receives an instruction identifying a user accessing social networking system 130 and accesses one or more of user profile store 305, the content store 310, the action log 320, and the edge store 330, or other suitable sources and retrieves information about the identified user as well as stories or other data. In one embodiment, stories or other data associated with users connected to the identified user are retrieved. The retrieved stories and other data are filtered by the newsfeed manager 335 to identify content likely to be relevant to the identified user. For example, stories associated with users not connected to the identified user are not identified as candidate stories or stories associated with users to which the identified user has less than a threshold affinity are not identified as candidate stories. In one embodiment, the newsfeed manager 335 may identify stories associated with users to which the identified user is inferentially connected, such as stories associated with users connected to an additional user that is connected to the identified user, as candidate stories. For example, the newsfeed manager 335 selects stories communicated between two users connected to the identified user as candidate stories.

In various embodiments, a newsfeed generated by the newsfeed manager 335 is a dynamic list that may include a complete listing of candidate stories or may include a limited number of candidate stories. The number of stories included in a newsfeed may be determined in part by a user preference included in user profile store 310. As described above, the newsfeed manager 335 identifies stories for presentation through a newsfeed as well as the order in which identified stories are presented by the newsfeed. For example, the newsfeed manager 335 determines that a user has a highest affinity for a specific user and increases the number of stories in the newsfeed associated with the specific user. The newsfeed manager 335 may also account for actions by a user that indicate preferences for types of stories and selects stories having the same, or similar, types for inclusion in the newsfeed. Additionally, the newsfeed manager 335 may analyze stories received by social networking system 140 from various users and obtains information about user preferences or actions from the analyzed stories. This information may be used to refine selection of stories for newsfeeds presented to various users.

A story presented by the newsfeed manager 335 identifies an action and a user that performed the action. One or more objects associated with the identified action may also be included in the story. This allows a user to identify actions performed by other social networking system users. The newsfeed manager 335 may update a story to include additional actions associated with the story, or with a user, an action, or an object identified by the story. For example, the newsfeed manager 335 updates a story describing an action performed by a user on a third-party system 130 to also identify an additional action performed on the third-party system 130 that is associated with the action, as further described below in conjunction with FIG. 4.

The authorization server 340 enforces one or more privacy settings of the users of the social networking system 140. A privacy setting of a user determines how particular information associated with a user can be shared, and may be stored in the user profile of a user in the user profile store 305 or stored in the authorization server 340 and associated with a user profile. In one embodiment, a privacy setting specifies particular information associated with a user and identifies the entity or entities with whom the specified information may be shared. Examples of entities with which information can be shared may include other users, applications, third-party systems 130 or any entity that can potentially access the information. Examples of information that can be shared by a user include user profile information like profile photo, phone numbers associated with the user, user's connections, actions taken by the user such as adding a connection, changing user profile information and the like.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third-party systems 130, specific third-party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users. For example, if a user creates a playlist on a third-party system or application and publishes the action to the social networking system, the authorization server 340 records the user as the owner of the playlist. The user then has the control over the privacy settings of the playlist including which users are allowed to publish further actions performed on the playlist.

The authorization server 340 includes logic to determine if certain information associated with a user can be accessed by a user's friends, third-party system 130 and/or other applications and entities. For example, a third-party system 130 that attempts to access a user's comment about a uniform resource locator (URL) associated with the third-party system 130 must get authorization from the authorization server 340 to access information associated with the user. Based on the user's privacy settings, the authorization server 340 determines if another user, a third-party system 130, an application or another entity is allowed to access information associated with the user, including information about actions taken by the user. For example, the authorization server 340 uses a user's privacy setting to determine if the user's comment about a URL associated with the third-party system 130 can be presented to the third-party system 130 or can be presented to another user. This enables a user's privacy setting to specify which other users, or other entities, are allowed to receive data about the user's actions or other data associated with the user.

The web server 345 links the social networking system 140 via the network 220 to the one or more client devices 210, as well as to the one or more third party websites 130. The web server 140 serves web pages, as well as other web-related content, such as JAVA®, FLASH®, XML and so forth. The web server 345 may provide the functionality of receiving and routing messages between the social networking system 140 and the client device 210, for example, instant messages, queued messages (e.g., email), text and SMS (short message service) messages, or messages sent using any other suitable messaging technique. A user may send a request to the web server 345 to upload information, for example, images or videos that are stored in the content store 210. Additionally, the web server 345 may provide application programming interface (API) functionality to send data directly to native client device operating systems, such as IOS®, ANDROID™, WEBOS® or RIM.

The web server 345 links the social networking system 140 via the network 220 to the one or more client devices 210, as well as to the one or more third-party systems 130. The web server 240 serves web pages, as well as other web-related content, such as JAVA®, FLASH®, extensible markup language (XML) and so forth. The web server 240 may receive and route messages between the social networking system 140 and the client device 110, for example, instant messages, queued messages (e.g., email), text and short message service (SMS) messages, or messages sent using any other suitable messaging technique. A user may send a request to the web server 345 to upload information, for example, images or videos that are stored in the content store 310. Additionally, the web server 340 may provide application programming interface (API) functionality to send data directly to native client device operating systems, such as IOS®, ANDROID™, WEBOS® or RIM®.

Figure 4:
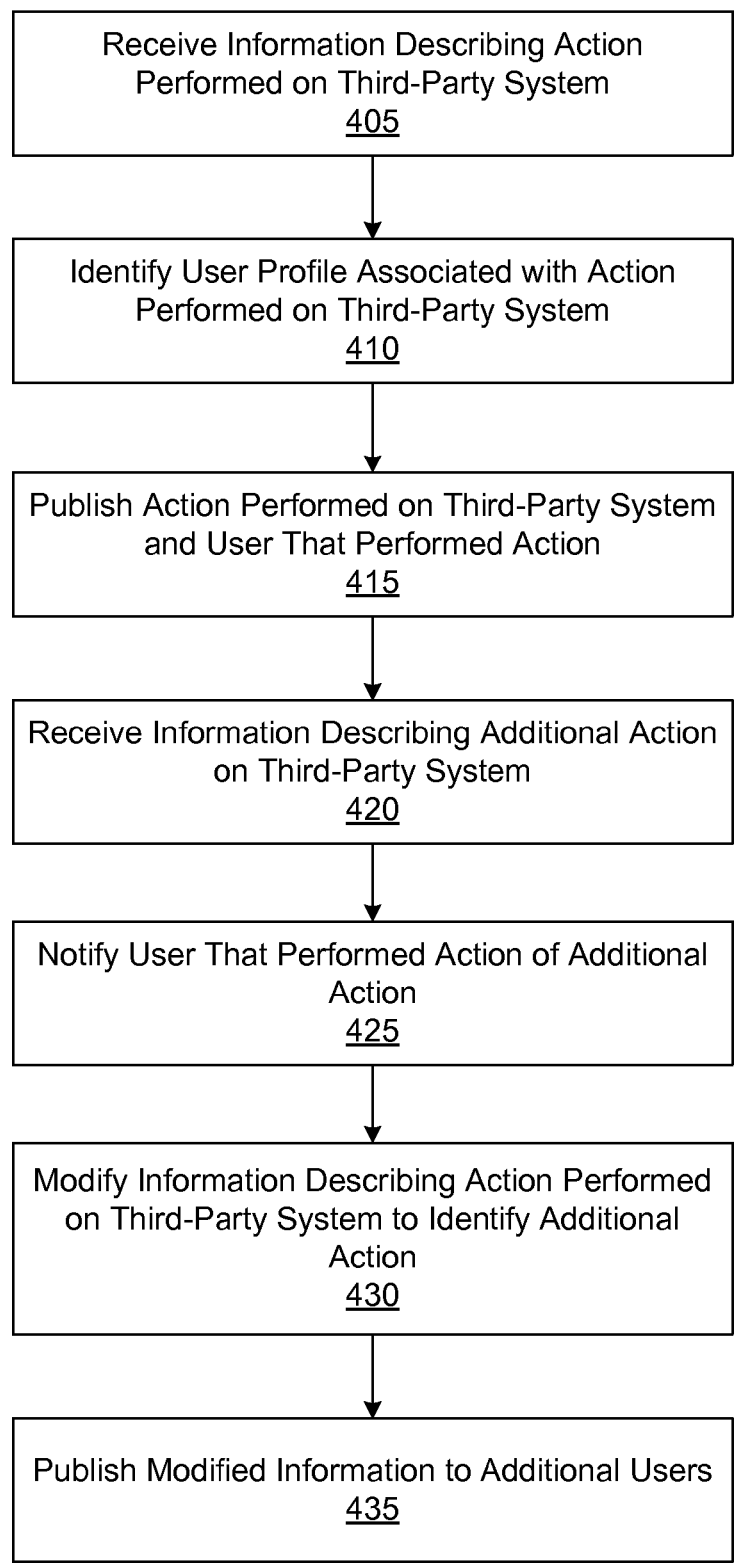
FIG. 4 is a flowchart of a method for identifying additional actions outside of a social networking system associated with an action performed outside of the social networking system, in accordance with an embodiment.

Associating Actions Performed Outside of a Social Networking System with Each Other FIG. 4 is a flowchart of one embodiment of a method for associating actions performed in a third-party system 130 with each other in a social networking system 140. When a user of the social networking system 140 performs an action on the third-party system 130, the social networking system 140 receives 405 information describing the action via the network 220. For example, the third-party system 130 sends the social networking system 140 a message identifying the third-party system 130 and describing the action (e.g., indicating whether the action is a purchase, a rating, a request for information, a subscription, a rental or the like) to the social networking system 140. The information may specify a type of action and may include a third-party identifier used by the third-party system 130 to identify the action as well as any additional information associated with the action. For example, additional information received by the social networking system 130 may identify an item purchased or rented or other suitable information.

Based on the received information describing the action on the third-party system 130, the social networking system 140 identifies 410 a user profile of a social networking system user associated with the identified action. As described above in conjunction with FIG. 1, the third party system 130 may access a cookie stored on the device used to perform the action and associated with the social networking system 130 through a nested iframe in the social networking system's domain, allowing the nested iframe to access the user information and send the information back to the third-party system 130. Alternatively, the social networking system 140 may communicate with the device used to perform the action to access the cookie associated with the social networking system 130 and stored on the device. This allows the third-party system 130 and the social networking system 140 to communicate about the user without sharing any of the user's personal information and without requiring the user to log into the social networking system 140. Alternatively, the information describing the action may include user identifying information, such as a login name or other suitable information used by the third-party system 130, which the social networking system 140 may compare to information stored in user profiles to identify a user profile including matching information.

The social networking system 140 stores the received information describing the action in the action log 320 and also stores an association between the information describing the action and the identified user profile in the action log 320 and/or in the edge store 330. In some embodiments, the newsfeed manager 335 generates a story describing the action performed on the third-party system 130 and the user associated with the user profile and publishes 415 the story to other users of the social networking system 130. For example, the generated story is included in newsfeeds presented to other users connected to the user associated with the identified user profile. Alternatively, the action logger 315 may publish 415 the action to other users connected to the user associated with the identified user profile by transmitting a notification message (e.g., an e-mail, a text message, or another suitable communication channel). Publication of the action to other users may be limited or regulated by one or more privacy settings associated with the identified user profile, allowing a user to limit publication of the action to other users.

After storing the information describing the action performed on the third-party system 130, the social networking system 140 receives 420 information describing an additional action performed on the third-party system 130 and that is associated with the action. The additional action may be performed by the same user or by a different user. For example, the additional action on the third-party system 130 is another user commenting on the action, sharing the action, expressing a preference for the action, or otherwise interacting with the action. The information describing the additional action may be received 420 using the techniques described above. In addition to identifying the third-party system 130 and the additional action (e.g., indicating whether the action is a purchase, a rating, a request for information, a subscription, a rental or the like), the information describing the additional action also identifies the action with which the additional action is associated. For example, the information describing the additional action may include a third-party identifier of the action as well as a third-party identifier of the additional action. The information identifying the additional action may also include any other suitable information.

The social networking system 140 identifies a user profile associated with the information describing the additional action, as described above, and stores the information describing the additional action in the action log 320. An association between the information describing the additional action and the identified user profile is also stored in the action log or in the edge store 330. Additionally, the action log 320 compares the information describing the additional action to data stored in the action log to determine whether the additional action is associated with a stored action. In one embodiment, the action log 320 determines whether the information describing the additional action includes a third-party identifier corresponding to the action performed on the third-party system 130 and having information previously stored in the action log 320. However, other suitable methods may be used to determine if the information describing the additional action is associated with the information describing the action.

If the additional action is associated with the action, a connection between the action and the additional action is stored in the edge store 330 or in the action log 320 and the action logger 315 notifies 425 the user associated with the user profile identified from the original action of the additional action. For example, the action logger 315 sends a notification message identifying the user corresponding to the user profile associated with the additional action to the user identified from the information describing the action via e-mail, text message, notification channel, or any other suitable communication channel. In one embodiment, the newsfeed manager 335 also modifies 430 the story, or other message, describing the action to identify the additional action associated with the action. For example, as shown in FIG. 1, a description of the additional action may be appended to, or included in, the story describing the action. The modified story or message may be further published 435 to users connected to the user and/or to the user performing the additional action, allowing those users to view both the additional action and the original action, providing context for the additional action. Privacy settings associated with the user or with the additional user may be retrieved and used to regulate publishing 435 of the modified description to other social networking system users. This allows social networking system users to be notified of actions performed outside of the social networking system 140 and also to easily identify relationships or associations between actions performed outside of the social networking system 140.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining user profiles associated with one or more users of a social networking system;
   receiving first information from a third-party system describing a first action performed on the third-party system by a first user of a social networking system, the third-party system associated with a domain different than a domain of the social networking system;
   storing the first information describing the first action and an association between the first information describing the first action and a first user profile associated with the first user that performed the action;
   receiving second information from the third-party system describing a second action performed on the third-party system, the second action performed in response to a story about the first action displayed on the third party system;
   identifying the first information describing the first action from the second information describing the second action;
   identifying the first user profile associated with the first user that performed the first action; and
   transmitting a notification of the second action to the first user.

2. The method of claim 1, wherein storing the first information describing the first action and the association between the first information describing the first action and the first user profile associated with the first user that performed the first action comprises:
   generating a description of the first action and the first user that performed the first action; and
   presenting the description to one or more users of the social networking system connected to the first user that performed the first action.

3. The method of claim 2, further comprising:
   modifying the description to identify the second action and the second user; and
   presenting the modified description to one or more users of the social networking system connected to the first user or connected to the second user.

4. The method of claim 2, wherein presenting the description to one or more users of the social networking system connected to the first user that performed the first action comprises:
retrieving one or more privacy settings associated with the first user; and
presenting the description to one or more users of the social networking system connected to the first user subject to the one or more privacy settings.

5. The method of claim 1, wherein the first information from the third-party system describing the first action performed on the third-party system comprises a message from the third-party system including one or more from a group consisting of: a description of the first action, a type of the first action, a third-party identifier of the first action, first user identification information, and any combination thereof.

6. The method of claim 1, wherein the second information from the third-party system describing the second action performed on the third-party system comprises a message from the third-party system including one or more from a group consisting of: a description of the second action, a type of the second action, a third-party identifier of the second action, a third-party identifier of the first action, second user identification information, and any combination thereof.

7. A method comprising:
receiving first information from a third-party system describing a first action performed on the third-party system by a first user of a social networking system, the third-party system associated with a domain different than a domain of the social networking system;
identifying a first user profile maintained by the social networking system and associated with the first information based on the first action described by the first information;
storing the first information from the third-party system describing the first action and an association between the first information from the third-party system describing the first action and the first user profile associated with the first information;
receiving second information from the third-party system describing a second action performed on the third-party system, the second action performed in response to a story about the first action displayed on the third party system;
storing a connection between the second information from the third-party system describing the second action and the first information from the third-party system describing the first action; and
transmitting a notification of the second action to the first user.

8. The method of claim 7, further comprising:
identifying a second user profile maintained by the social networking system and associated with the second information from the third-party system describing the second action; and
storing a connection between the information from the third-party system describing the second action and the identified second user profile.

9. The method of claim 8, wherein the notification of the second action specifies the identified second user profile.

10. The method of claim 7, further comprising:
generating a description of the first action and the first user profile associated with the first information from the third-party system describing the first action; and
presenting the description to one or more users of the social networking system connected to the first user profile associated with the first information from the third-party system describing the first action.

11. The method of claim 10, wherein presenting the description to one or more users of the social networking system connected to the first user profile associated with the first information from the third-party system describing the first action comprises:
presenting a story including the description in a newsfeed including a plurality of stories.

12. The method of claim 10, further comprising:
modifying the description to identify the second action; and
presenting the modified description to one or more users of the social networking system connected to the first user profile associated with the first information from the third-party system describing the first action.

13. The method of claim 10, wherein presenting the description to one or more users of the social networking system connected to the first user profile associated with the first information from the third-party system describing the first action comprises:
retrieving one or more privacy settings associated with the first user profile associated with the first information from the third-party system describing the first action; and
presenting the description to one or more users of the social networking system connected to the first user profile associated with the first information from the third-party system describing the first action subject to the one or more privacy settings.

14. The method of claim 7, wherein the first information from the third-party system describing the first action performed on the third-party system comprises a message from the third-party system including one or more from a group consisting of: a description of the first action, a type of the first action, a third-party identifier of the first action, user identification information, and any combination thereof.

15. The method of claim 7, wherein the second information from the third-party system describing the second action performed on the third-party system comprises a message from the third-party system including one or more from a group consisting of: a description of the second action, a type of the second action, a third-party identifier of the second action, a third-party identifier of the first action, second user identification information, and any combination thereof.

16. A method comprising:
receiving a first action at a third-party system associated with a domain different than a domain of a social networking system;
transmitting a description of the first action to the social networking system, the description including a third-party identifier of the first action used by the third-party system and an identifier of the third-party system;
displaying at the third-party system a story about the first action;
receiving a second action at the third-party system, the second action associated with the story about the first action; and
transmitting a description of the second action to the social networking system, the description of the second action including a third-party identifier of the second action used by the third-party system, the third-party identifier of the first action, and the identifier of the third-party system.

17. A computer program product comprising a non-transitory computer readable storage medium having instructions encoded thereon that, when executed by a processor, cause the processor to:
- maintain user profiles associated with one or more users of a social networking system;
- receive first information from a third-party system describing a first action performed on the third-party system by a first user of a social networking system, the third-party system associated with a domain different than a domain of the social networking system;
- store the first information describing the first action and an association between the first information describing the first action and a first user profile associated with the first user that performed the action;
- receive second information from the third-party system describing a second action performed on the third-party system, the second action performed in response to a story about the first action displayed on the third party system;
- identify the first information describing the first action from the second information describing the second action;
- identify the first user profile associated with the first user that performed the first action; and
- transmit a notification of the second action to the first user.

18. The computer program product of claim 17, wherein storing the first information describing the first action and the association between the first information describing the first action and the first user profile associated with the first user that performed the first action further causes the processor to:
- generate a description of the first action and the first user that performed the first action; and
- present the description to one or more users of the social networking system connected to the first user that performed the first action.

19. The computer program product of claim 18, wherein the computer readable storage medium further has instructions encoded thereon that, when executed by the processor, cause the processor to:
- modify the description to identify the second action and the second user; and present the modified description to one or more users of the social networking system connected to the first user or connected to the second user.

20. The computer program product of claim 18, wherein presenting the description to one or more users of the social networking system connected to the first user that performed the first action further causes the processor to:
- retrieve one or more privacy settings associated with the first user; and
- present the description to one or more users of the social networking system connected to the first user subject to the one or more privacy settings.

21. The computer program product of claim 17, wherein the first information from the third-party system describing the first action performed on the third-party system comprises a message from the third-party system including one or more from a group consisting of: a description of the first action, a type of the first action, a third-party identifier of the first action, first user identification information, and any combination thereof.

22. The computer program product of claim 17, wherein the second information from the third-party system describing the second action performed on the third-party system comprises a message from the third-party system including one or more from a group consisting of: a description of the second action, a type of the second action, a third-party identifier of the second action, a third-party identifier of the first action, second user identification information, and any combination thereof.

23. A computer program product comprising a non-transitory computer readable storage medium having instructions encoded thereon that, when executed by a processor, cause the processor to:
- receive first information from a third-party system describing a first action performed on the third-party system by a first user of a social networking system, the third-party system associated with a domain different than a domain of the social networking system;
- identify a first user profile maintained by the social networking system and associated with the first information based on the first action described by the first information;
- store the first information from the third-party system describing the first action and an association between the first information from the third-party system describing the first action and the first user profile associated with the first information;
- receive second information from the third-party system describing a second action performed on the third-party system, the second action performed in response to a story about the first action displayed on the third party system;
- store a connection between the second information from the third-party system describing the second action and the first information from the third-party system describing the first action; and
- transmit a notification of the second action to the first user.

24. The computer program product of claim 23, wherein the computer readable storage medium further has instructions encoded thereon that, when executed by the processor, cause the processor to:
- identify a second user profile maintained by the social networking system and associated with the second information from the third-party system describing the second action; and
- store a connection between the information from the third-party system describing the second action and the identified second user profile.

25. The computer program product of claim 24, wherein the notification of the second action specifies the identified second user profile.

26. The computer program product of claim 23, wherein the computer readable storage medium further has instructions encoded thereon that, when executed by the processor, cause the processor to:
- generate a description of the first action and the first user profile associated with the first information from the third-party system describing the first action; and
- present the description to one or more users of the social networking system connected to the first user profile associated with the first information from the third-party system describing the first action.

27. The computer program product of claim 26, wherein presenting the description to one or more users of the social networking system connected to the first user profile associated with the first information from the third-party system describing the first action further causes the processor to:
- present a story including the description in a newsfeed including a plurality of stories.

28. The computer program product of claim 26, wherein the computer readable storage medium further has instructions encoded thereon that, when executed by the processor, cause the processor to:
  modify the description to identify the second action; and
  present the modified description to one or more users of the social networking system connected to the first user profile associated with the first information from the third-party system describing the first action.

29. The computer program product of claim 26, wherein presenting the description to one or more users of the social networking system connected to the first user profile associated with the first information from the third-party system describing the first action further causes the processor to:
  retrieve one or more privacy settings associated with the first user profile associated with the first information from the third-party system describing the first action; and
  present the description to one or more users of the social networking system connected to the first user profile associated with the first information from the third-party system describing the first action subject to the one or more privacy settings.

30. The computer program product of claim 23, wherein the first information from the third-party system describing the first action performed on the third-party system comprises a message from the third-party system including one or more from a group consisting of: a description of the first action, a type of the first action, a third-party identifier of the first action, user identification information, and any combination thereof.

31. The computer program product of claim 23, wherein the second information from the third-party system describing the second action performed on the third-party system comprises a message from the third-party system including one or more from a group consisting of: a description of the second action, a type of the second action, a third-party identifier of the second action, a third-party identifier of the first action, second user identification information, and any combination thereof.

32. A computer program product comprising a non-transitory computer readable storage medium having instructions encoded thereon that, when executed by a processor, cause the processor to:
  receive a first action at a third-party system associated with a domain different than a domain of a social networking system;
  transmit a description of the first action to the social networking system, the description including a third-party identifier of the first action used by the third-party system and an identifier of the third-party system;
  display at the third-party system a story about the first action;
  receive a second action at the third-party system, the second action associated with the story about the first action; and
  transmit a description of the second action to the social networking system, the description of the second action including a third-party identifier of the second action used by the third-party system, the third-party identifier of the first action, and the identifier of the third-party system.

\* \* \* \* \*